United States Patent

Stork et al.

Patent Number: 5,963,930
Date of Patent: Oct. 5, 1999

[54] APPARATUS AND METHOD FOR ENHANCING TRANSFER FUNCTION NON-LINEARITIES IN PULSE FREQUENCY ENCODED NEURONS

[75] Inventors: David Geoffrey Stork, Stanford; Ronald Craig Keesing, Menlo Park, both of Calif.

[73] Assignees: Ricoh Company Ltd., Tokyo, Japan; Ricaoh Corporation, Menlo Park, Calif.

[21] Appl. No.: 08/497,593

[22] Filed: Jun. 30, 1995

Related U.S. Application Data

[63] Continuation of application No. 08/124,832, Sep. 21, 1993, abandoned, which is a continuation of application No. 07/721,145, Jun. 26, 1991, abandoned.

[51] Int. Cl.$^6$ .................................................. G06F 15/18
[52] U.S. Cl. ............................................................. 706/43
[58] Field of Search ....................... 395/27, 24; 307/201; 706/41, 43

[56] References Cited

U.S. PATENT DOCUMENTS

| | | | |
|---|---|---|---|
| 3,358,271 | 12/1964 | Marcus et al. | 706/41 |
| 3,934,231 | 1/1976 | Armstrong | 706/41 |
| 3,950,733 | 4/1976 | Cooper et al. | 706/26 |
| 4,326,259 | 4/1982 | Cooper et al. | 706/20 |
| 4,518,866 | 5/1985 | Clymer | 706/34 |
| 4,559,602 | 12/1985 | Bates, Jr. | 702/71 |
| 4,665,554 | 5/1987 | Sternberg | 382/308 |
| 4,802,103 | 1/1989 | Faggin et al. | 706/38 |
| 4,893,255 | 1/1990 | Tomlinson, Jr. | 364/223 |
| 4,996,593 | 2/1991 | Hopkins | 382/147 |
| 5,067,095 | 11/1991 | Peterson et al. | 706/33 |
| 5,131,072 | 7/1992 | Yoshizawa et al. | 706/38 |
| 5,131,073 | 7/1992 | Furuta et al. | 706/42 |
| 5,170,071 | 12/1992 | Shreve | 706/43 |
| 5,179,631 | 1/1993 | Guddanti et al. | 706/41 |
| 5,267,096 | 11/1993 | Buchan et al. | 360/41 |
| 5,333,241 | 7/1994 | Furuta et al. | 706/41 |

OTHER PUBLICATIONS

Hirai et al, A Digital Neuro–Chip with Unlimited Connectability for Large Scale Neural Networks, IEEE ICNN, 1989.

Eguchi et al, "Neural Network LSI Chip with On–Chip Learning" Proceed. of Int. Conf –on Neural Network, Jul. 8–12, 1991.

Wasserman et al, "Neural Computing Theory and Practice" Van Nostrand Reinhold, 1989.

Murry et al "A synchronous VLSI Neural Networks using Pulse–Stream Arithmetic", IEEE Journal of Solid–State Circuits, Jun. 1988.

Tomlinson, Jr. "A Digital Neural Network Architecture for VLSI" I JCNN, Jun. 1990.

*Primary Examiner*—Robert W. Downs
*Attorney, Agent, or Firm*—Blakely, Sokoloff, Taylor & Zafman LLP

[57] ABSTRACT

A method and apparatus is presented for synthesizing a network for use with pulse frequency encoded signals that has a smoothly saturating transfer characteristic for large signals based on the use of delay and an OR-gate. When connected to the output of a pulse frequency type of neuron, it results in a sigmoidal activation function.

11 Claims, 7 Drawing Sheets

APPARATUS AND METHOD FOR ENHANCING TRANSFER FUNCTION NON-LINEARITIES IN PULSE FREQUENCY ENCODED NEURONS

This is a continuation of application Ser. No. 08/124,832, filed Sep. 21, 1993, now abandoned, which is a continuation of application Ser. No. 07/721,145, filed Jun. 26, 1991, now abandoned.

BACKGROUND OF THE INVENTION

The present invention relates to a circuit and method employing logical operations for enhancing the transfer function nonlinearities of pulse frequency encoded neurons.

The back propagation algorithm credited to D. E. Rumelhart et al. (1) is one of the most popular and successful neural network learning or adaptation algorithms for neural networks. The usual neural model use assumes a McCullough-Pitts form in which the input signal vector is applied to a linear weighting network that produces a value at its output representative of the vector dot product of the input signal vector and a weighting vector. The output of the dot product network is typically applied to an output or activation network with a nonlinear no-memory transfer function. The most desirable nonlinearity for a wide variety of applications takes on the form of a sigmoidal function.

The back propagation algorithm provides a method for adjusting the weights in the network by tracing back from output to input the various contributions to the global error made by each weight component of the weighting vector network. This requires knowledge of the form of the transfer function, e.g., sigmoidal function. (Note that "sigmoidal" is a descriptor for a class of nonlinearities that have two saturating (limiting) states with a smooth transition from one to the other). An analytical expression representing the sigmoid or alternatively, "in vivo" perturbations of input signals allows the small signal gain between the input and output of the nonlinearity to be determined. The small signal perturbation gain corresponds to the derivative of the output relative to the input signal. Knowledge of the gain together with the input signal and current weight values permits the estimation of the contribution of each weight to the error.

More significantly, the adaptation process is concerned with minimizing the error between the observed response to a given input vector and the desired or ideal response. Knowledge of the derivative of the function, the weights and input values are required in the algorithm in order to estimate the error contribution of each unadjusted weight.

In order to make a reasonable estimate of each error contribution, the activation function should be known, stable and differentiable. In addition, practice has shown that a sigmoidal characteristic is preferred.

The present invention relates to the generation of a sigmoidal type activation function in artificial neurons using pulse-frequency type of data encoding. Neurons using this type of data encoding may be classified as deterministic pulse-frequency and stochastic pulse-frequency encoded neurons.

A deterministic pulse-frequency neuron is described in the Tomlinson, Jr., U.S. Pat. No. 4,893,255 dated Jan. 9, 1990. Tomlinson describes a neuron in which the vector dot product of the input and reference weighting vector is made by pulse-width modulation techniques. Two dot products are formed: one for excitatory inputs and the second for inhibiting inputs. The pulse-width encoded elements of each dot-product are separately OR-ed to form a nonlinear dot-product and decoded as analog voltage levels. Each voltage level is separately applied to a voltage-to-frequency converter. The output of each converter is a deterministic pulse stream with a pulse rate corresponding to the input voltage level. At this point, two pulse streams obtain (one representative of the excitatory dot product and the other representative of the inhibitory dot product) from which an activation function, or what Tomlinson, Jr., calls a "squash" function, is to be generated. The two pulse trains are combined so that "if an excitatory and inhibitory spike both occur simultaneously the inhibitory spike causes the complete nullification of any output spike". This final pulse stream is an approximation representative of the desired output function, i.e., a pulse rate corresponding to the vector dot product of the input vector and the reference weighting vector modified by a sigmoidal activation function.

The paper entitled "Neural Network LSI Chip with On-chip Learning", Eguchi, A., et al., Proceedings of the International Conference on Neural Networks, Seattle, Wash., Jul. 8–12, 1991 is indicative of the current state of the art in stochastically encoded neural networks. Neurons of this type were used in the simulated data presented herein. The stochastically encoded pulse frequency neuron used boolean logic methods operating on stochastic Bernoulli type sequences rather than the pulse-width techniques and deterministic voltage-to-frequency generators of Tomlinson, Jr. However, the squash or activation function that results from either method is comparable, having the same limitations and drawbacks as will be revealed in the following detailed discussion. Consequently, the present invention is applicable to both stochastic and deterministic neural output signals for the purpose of generating a more ideal sigmoidal activation function.

An ideal sigmoidal activation function is typically represented to be approximately of the form $$F(x) = \frac{1}{1 + e^{-x}} \tag{1}$$

as shown in FIG. 1. The derivative of this function, illustrated in FIG. 2, is $$F'(x) = \frac{e^{-x}}{(1 + e^{-x})^2} \tag{2}$$

A typical stochastically encoded, pulse frequency neuron is shown in FIG. 3. Each neuron 20 has both an excitatory and inhibitory sets of inputs shown as the composite elements 21 and 22 respectively. The input signals are weighted by means of AND-gates, typified by elements 23 and 24, and a set of input weighting signals on weight vector input lines 30. The output of the two sets of AND-gates is applied to OR-gates 25 and 26. The output of the excitatory OR-gate 25 is intended to be a pulse train representative of the activation function for the excitatory inputs and may be expressed as $$f(net+) = 1 - e^{-(net+)} \tag{3}$$

where net+ is the total number of pulses (spikes) being generated at the OR-gate inputs. f(net+) is the probability that any output of the OR-gate is a one and represents the upper half of the activation function. Similarly, the output of OR-gate 26 is intended to be representative of the lower half of the activation function and is expressed as $$f(net-) = 1 - e^{-(net-)} \tag{4}$$

This inhibitory half-activation function signal is complemented by inverter 27 and then combined with the excitatory half-activation function by means of AND-gate 28. The pulse rate output of AND-gate 28 may be expressed as $$f(net) = f(net+)(1 - f(net-)) \tag{5}$$

where f(net+) corresponds to the probability that any output pulse from OR-gate 25 is a one and (1−f(net−)), the probability that the output of OR-gate 26 is a zero. Thus, inverter 27 allows an excitatory pulse from OR-gate 25 to pass through AND-gate 28 only if no inhibitory pulse is present at the output of OR-gate 26. In this manner the complete activation function, f(net), is made available at output 29.

In order to gain insight into the behavior of f(net), substitute equations (3) and (4) into equation (5) thus yielding $$f(net) = e^{-(net-)}(1 - e^{-(net+)}) \tag{6}$$

Also, note that net represents the linear sum $$net = (net+) - (net-)$$

because the pulse frequency coding encodes negative and positive values separately as positive valued pulse rates. Significantly, this means that there are many ways to represent a number. Zero, for example may be represented by (net+)=(net−)=q where q≧0. This feature will prove to have a significant impact on the behavior of the nonlinear device represented by FIG. 3.

Consider a simple example in which we have two input variable $x_1$, and $x_2$
Let $$-1 \leq x_1 \leq +1 \tag{7}$$

and $$0 \geq x_2 \geq 1 \tag{8}$$

Because of the negative range of variable $x_1$, it must be represented by two absolute magnitude terms, $x_1^+$ and $x_1^-$.

$$x_1 = x_1^+ - x_1^- \tag{9}$$

where $$0 \geq x_1^+ + \geq 1$$
$$0 < x \leq 1$$

And for consistency, let $$x_2 = x_2^+ \tag{10}$$

where $$0 \leq x_2^+ \leq 1$$

Thus, the sum of $x_1$ and $x_2$, or net, may be expressed as $$net = x_1^+ + x_2^+ - x_1^- \tag{11}$$

Also, $$(net+) = x_1^+ + x_2^+ \tag{12}$$

and $$(net-) = x_1^- \tag{13}$$

In terms of FIG. 3, the variables $x_1^+$ and $x_2^+$ would be excitatory signals applied to inputs 21 while $x_1^-$ would be an inhibitory signal applied to inputs 22.

Substituting equations 12 and 13 into equation 6 yields $$f(net) = e^{-x_1^-}(1 - e^{-(x_1+ + x_2+)}) \tag{14}$$

It should be noted that because equal valued $x_2$ inputs may be expressed by different combinations of $x_2^+$ and $x_1^-$, the value of f(net) is not uniquely determine by the value of $x_1$ and $X_2$ alone. This is due to the failure of linear superpositioning caused by the nonlinearity of the neuron of FIG. 3.

FIG. 4 is an evaluation of f(net) for three cases wherein the inhibitory signal, $x_1^-$, is held constant as the value of net is varied. The range of net is from −1 to +2. The solid lines represent the locus of f(net) for $x_1$=0, ½ and 1. The dotted curves are drawn to suggest the envelope of extreme range of f(net) for $0 \geq x_1^- \leq 1$.

The significance of FIG. 4 is that no single stable transfer characteristic between net and f(net) can be established without imposing unrealistic constraints on the inputs $x_1^+$, $x_2^+$ and $x_1^-$. Thus, from this simple example it may be seen that "squash" function of Tomlinson, Jr. as represented by equation 6 does not necessarily yield a sigmoidal characteristic but rather results in a non-uniquely defined function for all values of net except the extrema ±1.

It will be appreciated that in order to effectively use the method of back propagation which depends on the determination of derivatives, such as df(net)/d(net), a better sigmoidal transfer characteristic is desired.

The two input example above may not be representative for neural networks having a larger number of excitatory and inhibitory input signals. To demonstrate this, refer to FIG. 5 which summarizes the results of numerous simulations using different numbers of excitatory and inhibitory inputs for the value of net ranging from −1 to +2. The two numbers associated with each curve represent the number of excitatory and inhibitory inputs, e.g., the lower curve labelled (6+, 3−) represents 6 excitatory and 3 inhibitory inputs.

Also, unlike FIG. 4, each transfer characteristic is the average over all uniformly distributed combinations of excitatory and inhibitory inputs for any given value of net. FIG. 4 shows that even the averaged transfer characteristic may deviate substantially from a sigmoidal characteristic. As the number of positive and negative number increases from (1+, 1−) to (6+, 3−) the average characteristic changes from sigmoidal to increasingly exponential like form. This is due to the functional asymmetry between excitatory and inhibitory pulses in the network: at any particular instant, a single inhibitory pulse at the input may nullify any number of simultaneously applied excitatory pulses. As the number of inputs increases, there is an increasing proportion of possible inputs that sum to a given value of net and that contain at least one inhibitory pulse at a given instant. Thus, as this proportion increases, the expected (average) value of the activation function, for a given value of net, decreases due to the increasing number of nullifications occurring within the pulse stream. One object of the present invention is to correct for this deleterious effect.

In addition to the fact that FIG. 5 is a set of average values, the actual simulation used to obtain this data, which do not rely upon the theoretical assumptions that led to the derivation of f(net) in equation (6) and FIG. 4, has a maximum value of f(net)=1 for the maximum value of net=2. However, the theoretical model for deriving equation 6 assumes an infinite number of inputs so that f(net)=1 when net increases indefinitely.

The present invention is also related to a copending application Ser. No. 07/673,804 entitled "A Circuit Employing Logical Gates for Calculating Activation Function on Derivatives on Stochasically-Encoded Signals" filed Mar. 22, 1991 by the same inventors and assigned to the same assignee.

SUMMARY OF THE INVENTION

One object of the present invention is to provide a method and apparatus for synthesizing a sigmoidal activation transfer function for pulse frequency encoded neurons by overcoming the aforementioned drawbacks in the current art.

Another object is to provide a method and apparatus using boolean logic and time delay methods for generating sigmoidal functions that are compatible with current implementations of pulse frequency encoded neurons.

Another object is to provide method and apparatus that permits complexity vs. performance trade-offs in synthesizing sigmoidal transfer functions.

A further object is to provide an artificial neuron incorporating improved sigmoidal characteristics.

DETAILED DESCRIPTION OF THE INVENTION

Figure 1:
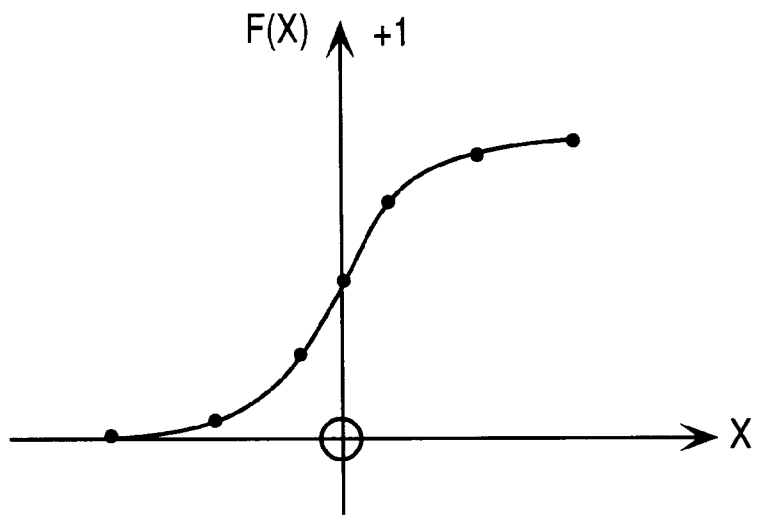
FIG. 1 shows a sigmoidal function.
Figure 2:
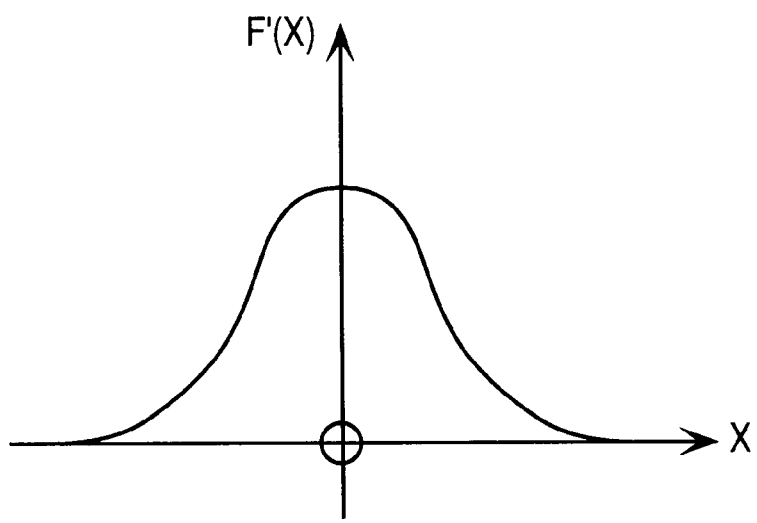
FIG. 2 shows the derivative of the sigmoid.
Figure 3:
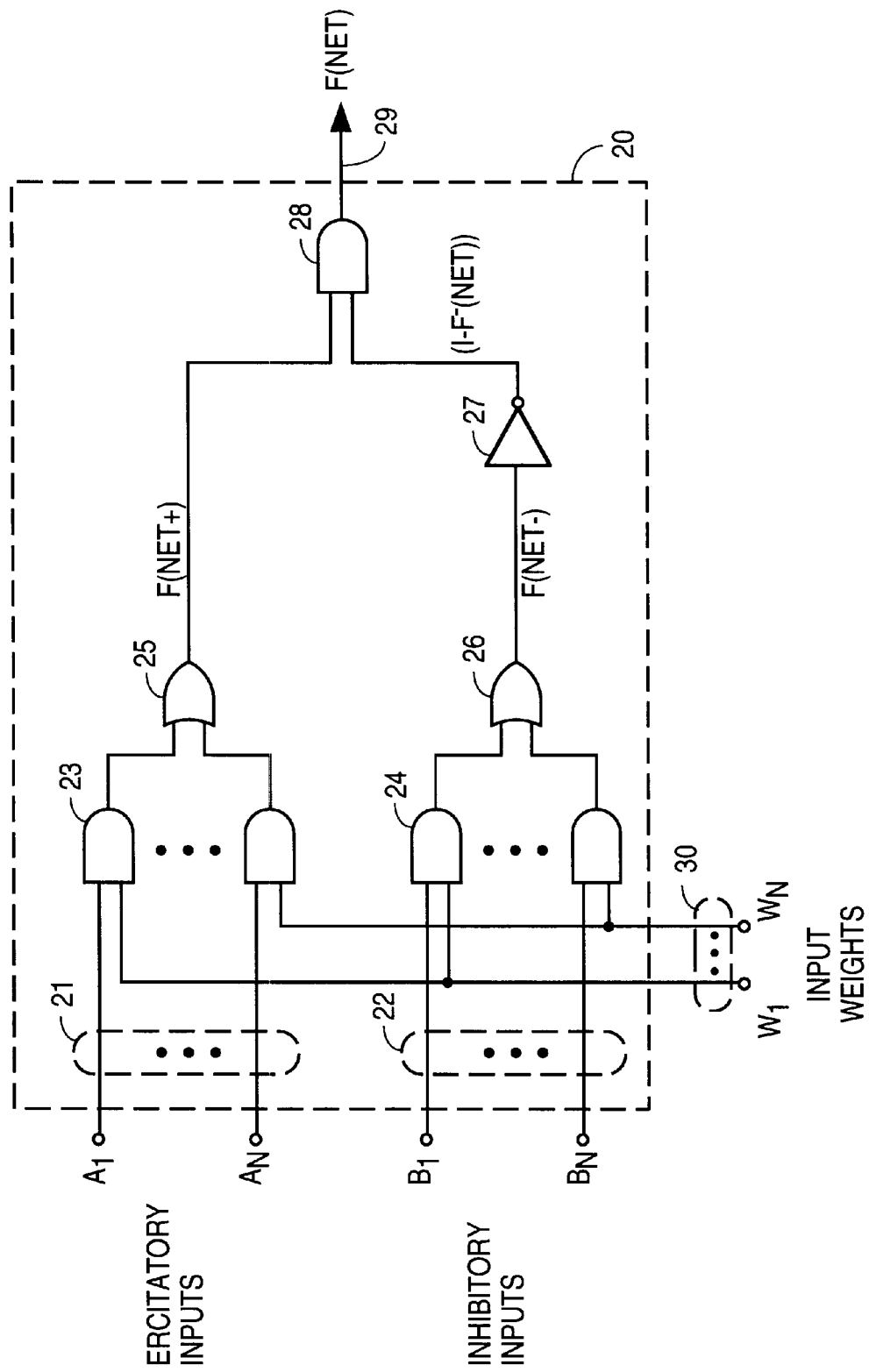
FIG. 3 shows a stochastic pulse frequency neuron with inhibitory and excitatory inputs.
Figure 4:
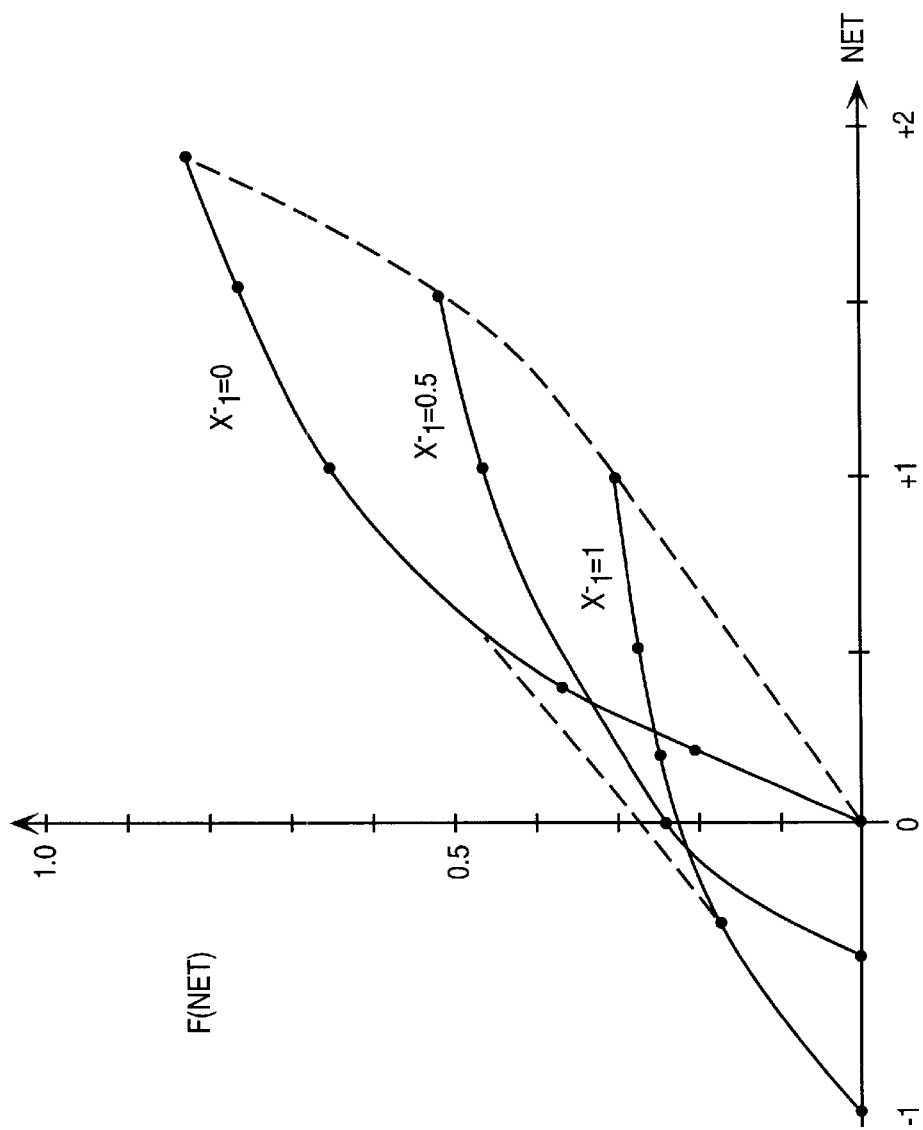
FIG. 4 is an evaluation of the idealized activation function, f(net), for two input variables and fixed inhibitory values.
Figure 5:
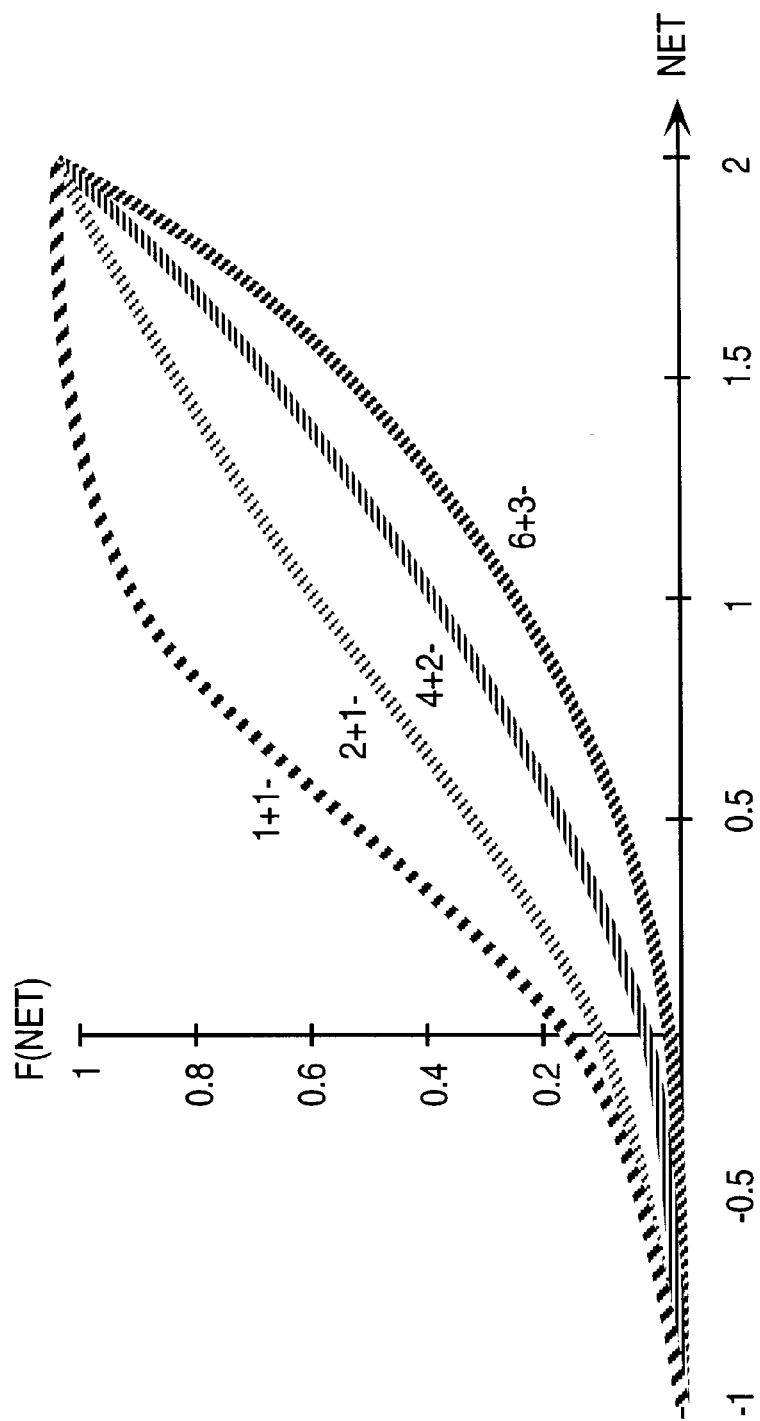
FIG. 5 shows the average activation functions for different numbers of excitatory and inhibitory inputs obtained from simulations.
Figure 6:
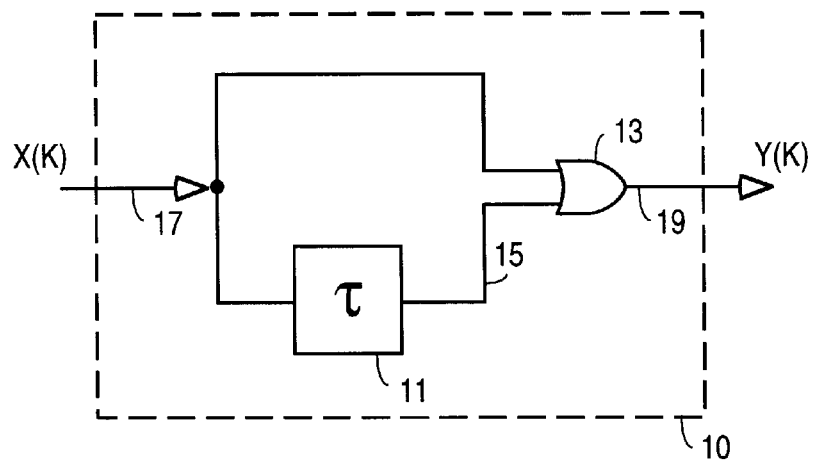
FIG. 6 is the preferred embodiment of a nonlinear boolean network with smooth transition to saturation.

In order to modify the exponential-like behavior of f(net) shown in FIG. 5 for case (6+, 3−), consider concatenating neuron 20 of FIG. 3 with a nonlinear network, shown in FIG. 6, having a smoothly saturating transfer characteristic. The output of neuron 20, f(net), is the x(k) input on line 17. The output signal, y(k), is g(net), at output 19. It is required that nonlinear network 10 be boolean so as to be compatible with the pulse frequency type processing used in the neuron structure 20. The combined structure constitutes a new neuron 40, shown in FIG. 7.

FIG. 6 shows a preferred embodiment of network 10 having the above mentioned desirable characteristics. The input, x(k), on input 17 is assumed to be a pulse frequency encoded signal, a Bernoulli sequence with time index k. The input signal, x(k), and a one unit delayed version x(k−1) caused by delay element 11 on line 15 are applied to a two input OR-gate 13. The output, y(k), appears at output line 19.

Because the pulse frequency signal, x(k), encodes the signal level as a probability (Stochastic and Deterministic Averaging Processors, Mars, P. and Poppelbaum, W. J., I.E.E., London and New York, Peter Peregrinus, Ltd., Stevenage U.K. and New York, 1981, ISBN 0 90648 44 3, pp. 20–31), the output y(k) may be represented as $$y(k)=x(k)+x(k-1)-x(k)*x(k-1) \quad (15)$$

Thus, the output value, y(k), is equal to the probability of a pulse occurring on input line 17 at time index k plus the probability of pulse having occurred at time index k−1 minus the probability that a pulse occurred at time index k and k−1. The latter term is a product of the probabilities because x(k) and x(k−m) are independent for Bernoulli sequences for all m≧1. This suggests that the delay element 11 may have a delay of m intervals (m≧1).

Figure 8:
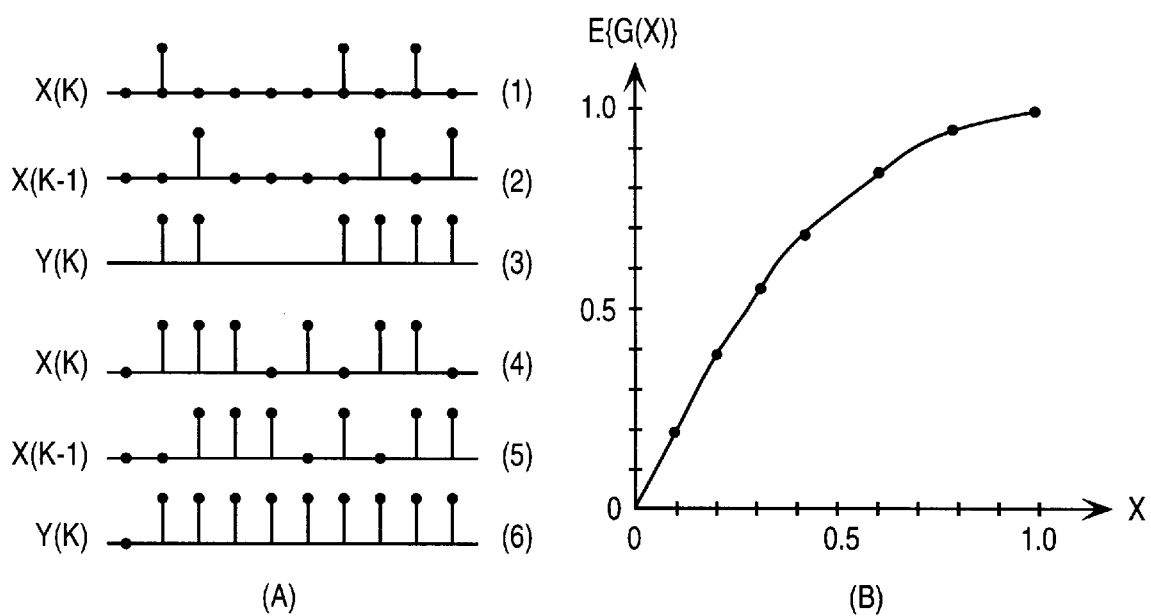
FIG. 8(a) shows examples of pulse frequency encoded signals associated with the network of FIG. 6.
FIG. 8(b) shows the average value of the decoded output of y(k).

The average or expected value of y(k) under the assumption that all pulses are statistically representative of the same value is $$y(k)=2x(k)-x^2(k) \quad (16)$$

which is plotted in FIG. 8. Note that for small value of x(k), i.e., when the pulse densities are low, the output is approximately linear with a gain of two, as shown in lines (1) to (3) of FIG. 8 and become saturating for high pulse densities as shown in lines 4 through 6. The squared factor, $x^2(k)$, is negligible and pulse rate are approximately doubled. When x(k) approaches unity, the maximum pulse rate, the product term becomes significant because a greater percentage of pulses are occurring simultaneously. The result is a smoothly saturating transfer characteristic.

Figure 9:
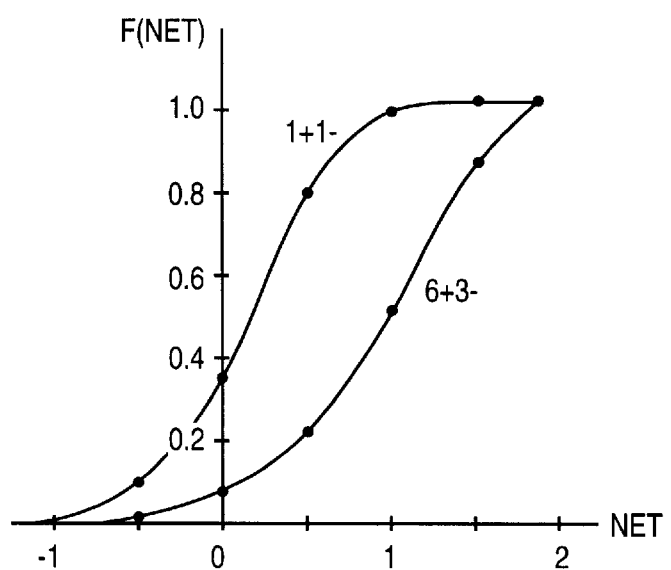
FIG. 9 is representative of the modified transfer characteristics for two cases shown in FIG. 5.

If the f(net) functions for (1+, 1−) and (6+, 3−) of FIG. 5 where to be applied to network 10, the results would be approximately as shown in FIG. 9. The (1+, 1−) case remains sigmoidal while the exponential-like (6+, 3−) case is noticeable modified to be more sigmoidal. Because the curves of FIG. 5 are averages, it is not strictly correct to apply the averages to the transfer characteristic of FIG. 8. The averaging should be done at the output of nonlinear network 10. However, the procedure is suggestive of the results to be expected.

Figure 7:
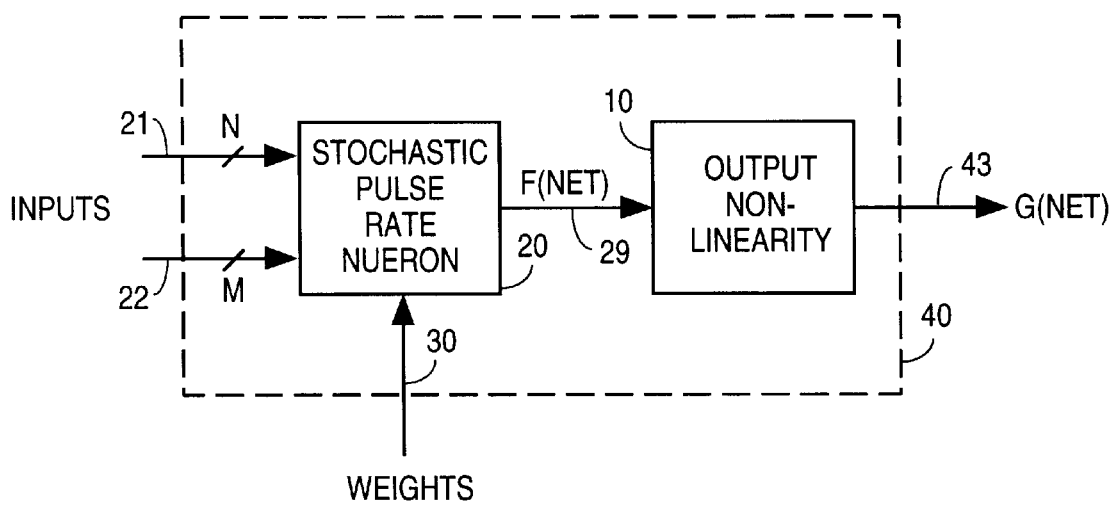
FIG. 7 is a block diagram showing the improved neuron structure.
Figure 10:
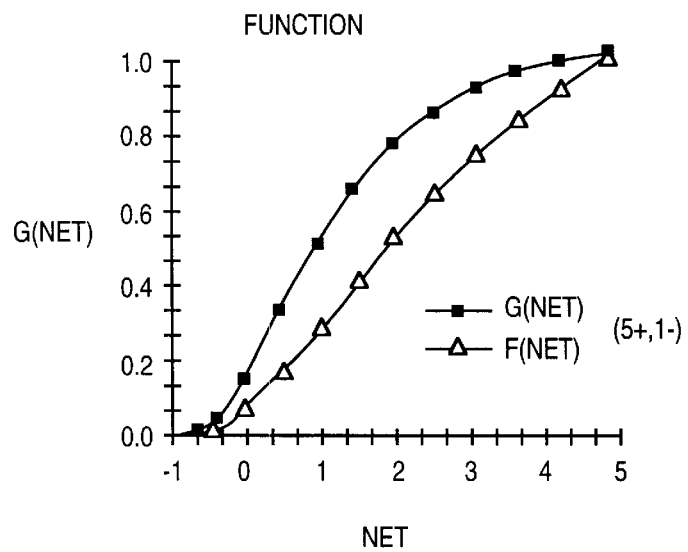
FIG. 10 is a comparison of the simulated results for five excitatory and one inhibitory input, with and without the tandem output nonlinear network.

FIG. 10 shows the results of computer simulations for the case where five excitatory inputs and one inhibitory input (5+, 1−) was used. The lower curve is the average transfer characteristic f(net), obtained at the output of the circuit of FIG. 3. The upper curve is for g(net) obtained from the tandem network 10 as shown in FIG. 7.

It should be noted that other possible network structures suggest themselves as extensions of the concepts disclosed above. These include the use of more than one network of the type shown in FIG. 6 connected in tandem at the output of the neuron of FIG. 3. Each successive tandem network increasing the tendency toward a sigmoidal transfer characteristic, g(net). Accordingly, output nonlinearity 10 of FIG. 7 may be interpreted as the tandem ensemble of networks of the type shown in FIG. 6. Also, delay intervals may vary for each tandemly connected network.

Figure 11:
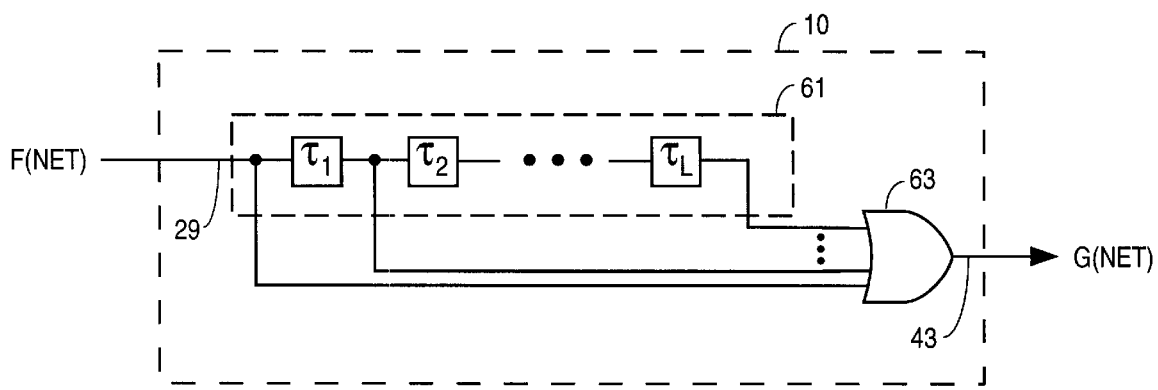
FIG. 11 shows a tapped delay line structure for a generating a saturating output nonlinearity.

FIG. 11 shows a nonlinear structure incorporating a tapped delay 61 and a multiple input OR-gate 63 for performing the nonlinear transformation on the input signal f(net). As in the case of the single delay element 11 of FIG. 6, the various delays ($\tau_1, \tau_2, \ldots, \tau_n$) cause an approximately linear characteristics for low density pulse rate input. The gain being approximately equal to the number of taps. As the rate increases or the number of taps increases, maximum pulse rate is approached causing a smooth saturation type transfer characteristic.

In summary, a method and apparatus for producing a saturating nonlinearity by means of delay and OR-gate combination has been disclosed. When combined with a pulse frequency type neuron it was shown to have the desirable effect of producing a new neuronal structure with an improved sigmoidal transfer characteristic for the activation network. Significantly, unlike prior art, the nonlinear network used to bring this beneficial result introduces memory (delay elements) into the output stages of the new neuronal network which previously have used only no-memory nonlinearities.

We claim:

1. A network for operating on a pulse frequency encoded input signal for producing a pulse frequency encoded output signal with a modified pulse rate, the network comprising:
    a) an input terminal for inputting the pulse frequency encoded input signal;
    b) a delay circuit with an input connected to the input terminal for inputting the pulse frequency encoded input signal and outputting, at an output, a delayed pulse frequency encoded input signal, delayed by at least one minimal pulse interval; and
    c) an OR-gate with an output, a first input connected to the input terminal, and a second input connected to the output of the delay circuit, for OR-ing the pulse frequency encoded input signal with the delayed pulse frequency input signal, and for producing a pulse frequency encoded output signal at the output with an increased pulse rate relative to the pulse frequency encoded input signal pulse rate, the increased pulse rate increasing monotonically relative to the pulse frequency encoded input signal pulse rate and smoothly approaching a saturation rate equal to a prescribed maximum allowable pulse frequency encoded signal pulse rate.

2. The network of claim 1 wherein the delay circuit is a tapped delay line with a multiplicity of output taps for producing a multiplicity of variously delayed output signals delayed by at least one minimum pulse interval at the output Ia, the OR-gate means having a corresponding multiplicity of inputs for inputting and combining the multiplicity of variously delayed output signals by logical OR-ing all OR-gate means input signals to produce a pulse frequency encoded output signal representative of the unencoded signal after passing through a circuit with a sigmoidal type transfer characteristic.

3. The network of claim 1 wherein the delay means comprises at least one delay element.

4. The network of claim 1 wherein the delay means is a flip-flop.

5. An artificial pulse frequency type neuron with improved pulse frequency encoded sigmoidal squashing characteristics comprising:
    a) a pulse frequency type neuron with a prescribed maximum pulse operating rate, the pulse frequency type neuron including,
        i) an excitatory vector input terminal for inputting a pulse frequency encoded excitatory vector input signal with at least one vector element,
        ii) an inhibitory vector input terminal for inputting a pulse frequency encoded inhibitory vector input signal with at least one vector element,
        iii) a synaptic weighting vector input terminal for inputting a pulse frequency encoded synaptic weighting vector, and
        iv) an output terminal or outputting a pulse frequency encoded neuron output signal that is a combined excitatory and inhibitory pulse frequency encoded synaptic weighted signal;
    b) a sigmoidal enhancement circuit having an input pulse rate to output pulse rate transfer nonlinear characteristic that monotonically increases the output pulse rate, relative to the input pulse rate, the output rate smoothly approaching a prescribed maximum allowable rate corresponding to the pulse frequency encoded neuron prescribed maximum pulse operating rate, for operating on the pulse frequency encoded neuron output signal, a for producing at an output a pulse frequency encoded signal with a modified pulse rate, the sigmoidal enhancement circuit comprising,
        i) an enhancement circuit input terminal connected to the output of the pulse frequency type neuron,
        ii) delay circuit with an input connected to the output terminal of the pulse frequency type neuron for inputting the pulse frequency encoded neuron output signal and outputting a delayed pulse frequency encoded neuron output signal, delayed by at least one nominal pulse interval, and
        iii) OR-gate means having a first input terminal connected to the enhancement circuit input terminal, a second input terminal connected to the output of the delay means for producing the pulse frequency encoded output signal with a modified pulse rate.

6. The neuron of claim 5 wherein the delay means is a tapped delay line with a multiplicity of output taps and the OR-gate means has a corresponding multiplicity of second input terminals for inputting signals from the multiplicity of output taps for logically OR-ing signals on all OR-gate means input terminals.

7. The neuron of claim 5 wherein the delay means is a flip-flop.

8. The neuron of claim 5 further comprising a serial chain enhancement circuit that includes at least one sigmoidal enhancement circuit, each sigmoidal enhancement circuit connected in serial to form a serially connected chain of sigmoidal enhancement circuits, the serial chain enhancement circuit having a single input connected to the artificial pulse frequency type neuron with improved pulse frequency encoded sigmoidal squashing function characteristics output for providing further improved sigmoidal output characteristics.

9. A method for transforming a pulse frequency encoded input signal and directly producing, without decoding, a pulse frequency encoded output signal with a modified pulse rate, the method steps comprising:

a) inputting a pulse frequency encoded input signal;

b) delaying the pulse frequency encoded input signal by at least one nominal pulse interval; and c) logically OR-ing the pulse frequency encoded input signal and the delayed pulse frequency encoded input signal and producing a pulse frequency encoded output signal with a modified pulse rate, the modified pulse rate being a nonlinear function of the pulse frequency encoded input signal rate that increases monotonically with the pulse frequency encoded input signal rate and smoothly approaches a maximum pulse rate corresponding to a prescribed maximum pulse frequency encoded signal pulse rate.

10. The method of claim 9 wherein step (b) comprises producing a multiplicity of variously delayed signals by delaying the pulse frequency encoded input signal from step (a), each delayed signal being delayed by at least one nominal pulse interval, and step (c) comprises logically OR-ing the multiplicity of variously delayed signals from step (b) and the pulse frequency encoded input signal from step (a).

11. The method of claim 9 further comprising the following steps:

a) using the pulse frequency encoded output signal as a pulse frequency encoded input signal; and b) repeating the steps of claim 9 at least once.

* * * * *